US008087137B2

(12) United States Patent
Wang

(10) Patent No.: US 8,087,137 B2
(45) Date of Patent: Jan. 3, 2012

(54) FLAT CLAMPING HAND TOOL STRUCTURE

(76) Inventor: Tian Shoei Wang, Taichung (TW)

( * ) Notice: Subject to any disclaimer, the term of this patent is extended or adjusted under 35 U.S.C. 154(b) by 193 days.

(21) Appl. No.: 12/634,701

(22) Filed: Dec. 10, 2009

(65) Prior Publication Data

US 2011/0138973 A1 Jun. 16, 2011

(51) Int. Cl.
*B23P 13/00* (2006.01)
*B23P 19/04* (2006.01)
*B25B 27/00* (2006.01)
*B25B 7/04* (2006.01)
*B25B 7/12* (2006.01)
*B23Q 3/02* (2006.01)

(52) U.S. Cl. ................ 29/266; 29/270; 29/253; 29/257; 29/261; 269/91; 269/95; 81/330; 81/367

(58) Field of Classification Search .................... 29/270, 29/253, 257, 261, 268, 270.2; 269/3, 6, 91, 269/95; 81/330, 367
See application file for complete search history.

(56) References Cited

U.S. PATENT DOCUMENTS 1,586,297 A * 5/1926 Du Bois .......................... 72/387
1,832,879 A * 11/1931 Ruskin .......................... 606/208
2,590,792 A * 3/1952 Reneer ............................ 81/127
4,219,919 A * 9/1980 Fischbein et al. ............... 29/270
4,235,073 A * 11/1980 Tracy ................................ 59/11
4,365,411 A * 12/1982 Muldoon, Jr. ................... 29/845
4,769,891 A * 9/1988 Corral ............................. 29/268
5,016,503 A * 5/1991 Morton ........................... 81/127
5,121,624 A * 6/1992 Haughian .................. 72/409.19
5,165,155 A * 11/1992 Adams ............................ 29/268
6,412,375 B1 * 7/2002 Wang et al. ...................... 81/418
6,715,193 B1 * 4/2004 Wynn, Jr. ........................ 29/239
7,189,234 B2 * 3/2007 Zucherman et al. .......... 606/249

* cited by examiner

*Primary Examiner* — Alvin Grant

(57) ABSTRACT

A flat clamping hand tool structure includes a left clamping seat having one side with a left fixing portion facing a right fixing portion on one side of a right clamping seat. The first and second fixing members move up and down in left and right mounting slots of the left and right clamping seats by left and right swing plates which are pivotally connected with upper and lower holders. The left and right clamping seats are guided to move by guiding blocks of the upper and lower holders to slide along guiding grooves of the left and right clamping seats. Left and the right arms pivot together through a first pivot member. Left and right limit portions of the left and right swing plates mesh with each other so as to drive the left and right clamping seats to carry out a clamping motion.

2 Claims, 9 Drawing Sheets

FLAT CLAMPING HAND TOOL STRUCTURE

BACKGROUND OF THE INVENTION

1. Field of the Invention

The present invention relates to a flat clamping hand tool structure, in particular to a flat clamping hand tool structure which provides a steady linear clamping motion with respect to a work piece by operating left and right arms so as to get work quality and enhance its function.

2. Description of the Prior Art

Canvas is provided with holes and rivets. If the demand for the holes and rivets is large, it will be performed with a processing machine, such as a perforating machine or a riveting machine, at the manufacture factor. If the demand for the holes and rivets is small, it will be performed with a hand tool, such as a hand clamp device. Taiwanese Patent Number M248586 disclosed a hand clamp device with a poka-yoke mechanism.

The canvas is placed on a work table of the perforating machine, the riveting machine, or the hand clamp to be perforated or riveted by a tubular blade or a rivet post in a vertical direction. Because the tubular blade is perpendicular to the canvas, the canvas can be perforated smoothly. The rivet post is also perpendicular to a rivet holder for compressing male and female rivet members to form a rivet buckle, so that the canvas and the rivet buckle can be fastened firmly, without deformation.

However, the processing machine and the hand clamp device are not portable and disadvantageous for on-the-spot perforation and riveting. Taiwanese Patent Number M314103, entitled "Improved Hand Tool Structure", which is portable. The user can operate it by hands so that the canvas can be perforated or riveted with ease. The conventional clamp comprises a main arm and a second arm which are pivotally connected. The jaws of the clamp are rotated in a sector motion, not a linear motion. For a thick canvas, the blades contact the surfaces of the canvas asynchronously, which may result in incomplete or uneven perforations. Sometimes, the clamp cannot be operated smoothly. Similarly, when the canvas is riveted with rivet buckles, the working member (rivet post) does not compress the rivet totally. The rivet buckles may not be riveted tightly or fixed to the canvas firmly. Even the rivet buckles may be deformed. Thus, a need for improvement still exists.

SUMMARY OF THE INVENTION

The primary object of the present invention is to provide a flat clamping hand tool structure comprising a left arm and a right arm; an inner edge of one end of the left arm being pivotally connected with an inner edge of one end of the right arm through a first pivot member, an outer edge of the end of the left arm being pivotally connected with a first end of a left swing plate through a second pivot member, an outer edge of the end of the right arm being pivotally connected with a first end of a right swing plate through a third pivot member; the left swing plate having a left limit portion protruding from a middle portion thereof, the right swing plate having a right limit portion protruding from a middle portion thereof, the left limit portion being provided with first teeth and the right limit portion being provided with second teeth for meshing with each other, the left limit portion and the right limit portion being pivotally connected with a U-shaped upper holder and a U-shaped lower holder through a fourth pivot member and a fifth pivot member, respectively; the upper holder having a pair of first holder bits which are parallel, the lower holder having a pair of second holder bits which are parallel, the first and second holder bits being provided with guiding blocks which are aligned each other; a second end of the left swing plate being pivotally connected with a U-shaped left clamping seat through a first fixing member, a second end of the right swing plate being pivotally connected with a U-shaped right clamping seat through a second fixing member; the left clamping seat having upper and lower surfaces each formed with a left mounting slot for the first fixing member to be inserted therein, the right clamping seat having upper and lower surfaces each formed with a right mounting slot for the second fixing member to be inserted therein, inside the left and right clamping seats being formed with guiding grooves corresponding to the guiding blocks of the upper and lower holders, the left clamping seat having one side provided with a left fixing portion which faces a right fixing portion provided on one side of the right clamping seat; the left and right fixing portions are coupled with working members, respectively; the first and second fixing members being moved up and down in the left and right mounting slots of the left and right clamping seats by the left and right swing plates which are pivotally connected with the upper and lower holders, the left and right clamping seats being guided to move by the guiding blocks of the upper and lower holders to slide along the guiding grooves of the left and right clamping seats, the left arm and the right arm being pivoted together through the first pivot member, with the second and third pivot members to link the left and right swing plates, the left and right limit portions of the left and right swing plates meshing with each other such that the left and right clamping seats are driven to move levelly for a clamp motion by the guiding blocks of the upper and lower holders to slide along the guiding grooves of the left and right clamping seats synchronously. The working members provide do a linear clamping motion with respect to a work piece by operation of the left and right arms. The present invention can be operated smoothly so as to get better work quality.

A further object of the present invention is to provide a flat clamping hand tool structure, wherein the left and right clamping seats are provided with the left and right fixing portions which correspond to each other. The left and light fixing portions are coupled with the working members. The left and right fixing portions of the left and right clamping seats are threaded bolts. The working members are formed with threaded holes, so that the working members can be screwed to the fixing portions. The working members mounted on the left and right clamping seats can be replaced with other working members in different types.

Further benefits and advantages of the present invention will become apparent after a careful reading of the detailed description with appropriate reference to the accompanying drawings.

DETAILED DESCRIPTION OF THE PREFERRED EMBODIMENTS

Embodiments of the present invention will now be described, by way of example only, with reference to the accompanying drawings.

Figure 1:
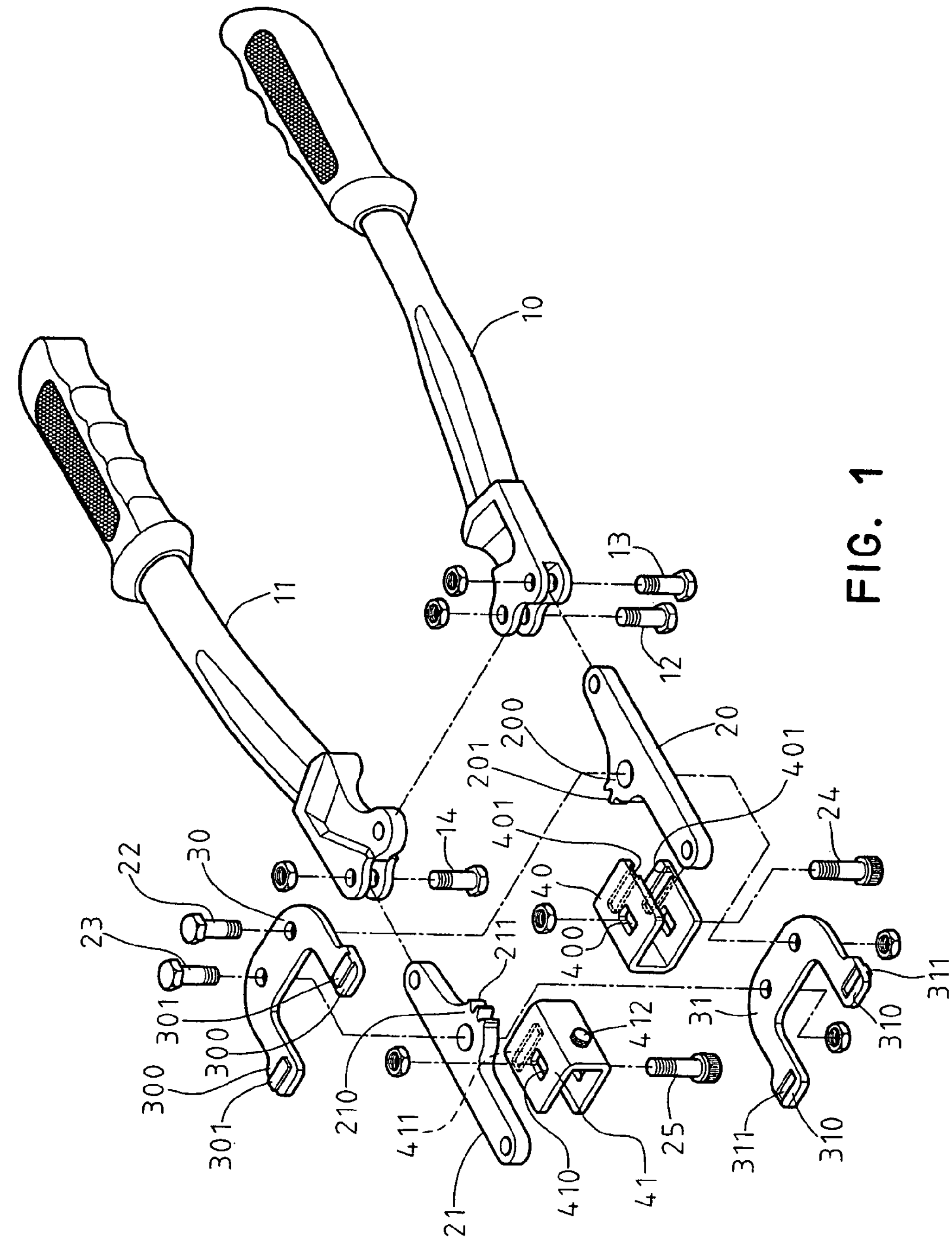
FIG. 1 is an exploded view of the present invention.
Figure 2:
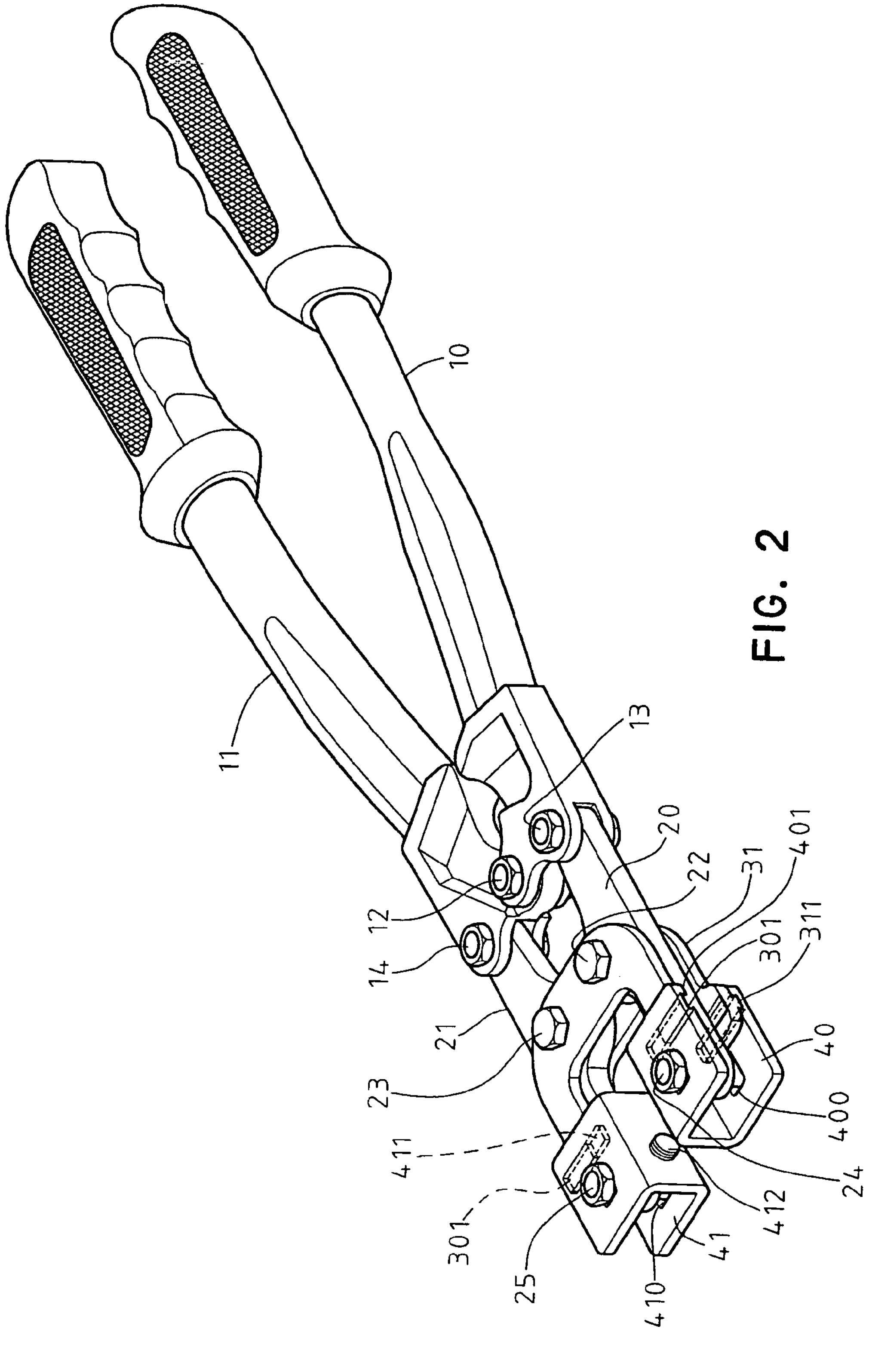
FIG. 2 is a perspective view of the present invention.
Figure 3:
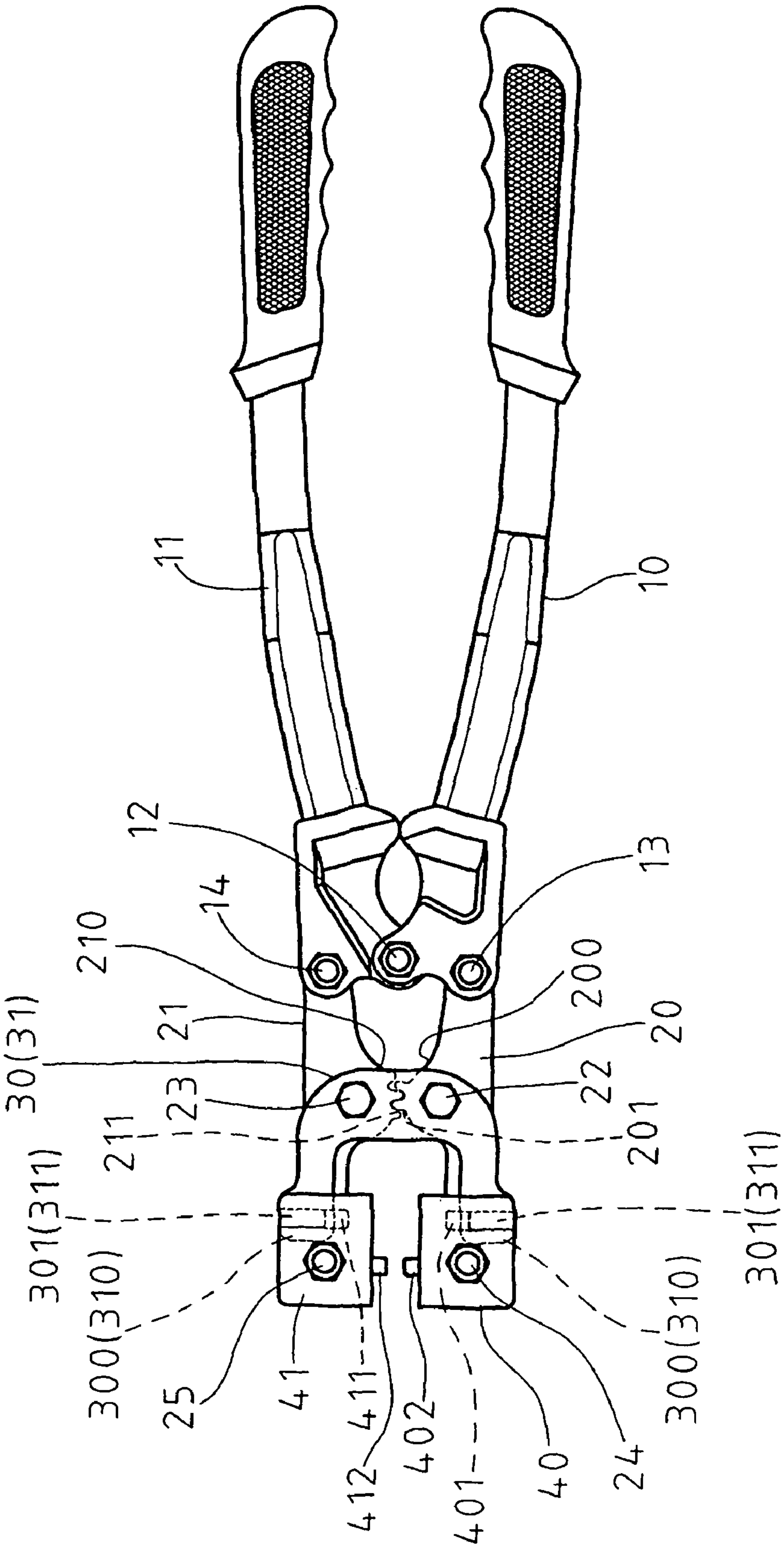
FIG. 3 is a top view of the present invention.

As shown in FIG. 1 to FIG. 3, a flat clamping hand tool structure according to a preferred embodiment of the present invention comprises a left arm 10 and a right arm 11. An inner edge of one end of the left arm 10 is pivotally connected with an inner edge of one end of the right arm 11 through a first pivot member 12. An outer edge of the end of the left arm 10 is pivotally connected with a first end of a left swing plate 20 through a second pivot member 13. An outer edge of the end of the right arm 11 is pivotally connected with a first end of a right swing plate 21 through a third pivot member 14.

The left swing plate 20 has a left limit portion 200 protruding from a middle portion thereof. The right swing plate 21 has a right limit portion 210 protruding from a middle portion thereof. The left limit portion 200 is provided with first teeth 201 and the right limit portion 210 is provided with second teeth 211 for meshing with each other. The left limit portion 200 and the right limit portion 210 are pivotally connected with a U-shaped upper holder 30 and a U-shaped lower holder 31 through a fourth pivot member 22 and a fifth pivot member 23, respectively.

The upper holder 30 has a pair of first holder bits 300 which are parallel. The lower holder 31 has a pair of second holder bits 310 which are parallel. The first and second holder bits 300, 310 are provided with guiding blocks 301, 311 which are aligned each other. A second end of the left swing plate 20 is pivotally connected with a U-shaped left clamping seat 40 through a first fixing member 24. A second end of the right swing plate 21 is pivotally connected with a U-shaped right clamping seat 41 through a second fixing member 25. The left clamping seat 40 has upper and lower surfaces each formed with a left mounting slot 400 for the first fixing member 24 to be inserted therein. The right clamping seat 41 has upper and lower surfaces each formed with a right mounting slot 410 for the second fixing member 25 to be inserted therein. Inside the left clamping seat 40 and right clamping seat 41 are formed with guiding grooves 401, 411 corresponding to the guiding blocks 301, 311 of the upper holder 30 and the lower holder 31. The left clamping seat 40 has one side provided with a left fixing portion 402 which faces a right fixing portion 412 provided on one side of the right clamping seat 41. The left and right fixing portions 402, 412 are coupled with working members 50, 51, respectively. The first and second fixing members 24, 25 can be moved up and down in the left and right mounting slots 400, 410 of the left and right clamping seats 40, 41 by the left and right swing plates 20, 21 which are pivotally connected with the upper and lower holders 30, 31. The left and right clamping seats 40, 41 are guided to move by the guiding blocks 301, 311 of the upper and lower holders 30, 31 to slide along the guiding grooves 401, 411 of the left and right clamping seats 40, 41.

Figure 4:
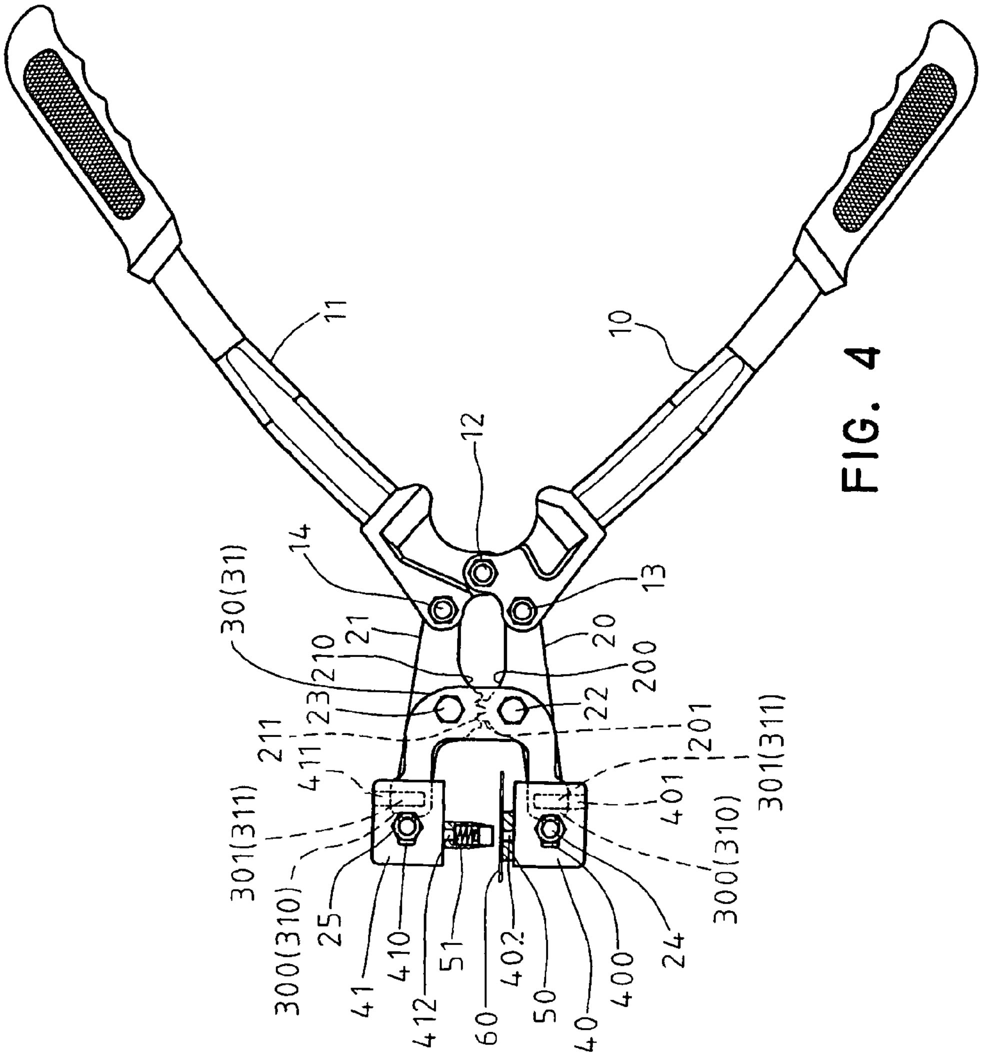
FIG. 4 is a schematic view according to a first preferred embodiment of the present invention before clamping.
Figure 6:
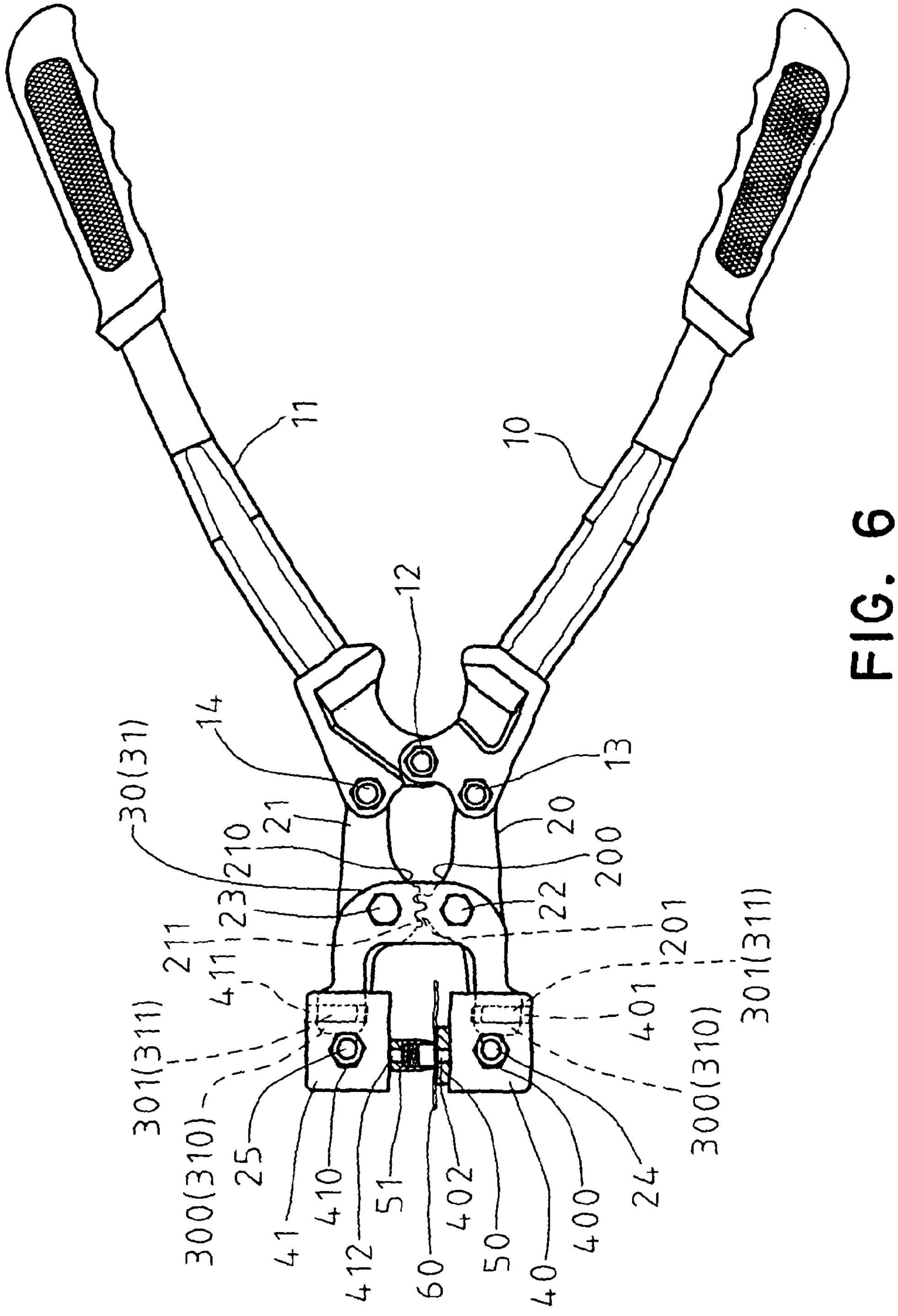
FIG. 6 is a schematic view according to the first preferred embodiment of the present invention after clamping.

As shown in FIGS. 4 and 6, the left arm 10 and the right arm 11 are pivoted together through the first pivot member 12. With the second and third pivot members 13, 14 to link the left and right swing plates 20, 21, the left and right limit portions 200, 210 of the left and right swing plates 20, 21 mesh with each other, such that the left and right clamping seats 40, 41 are driven to move levelly for a clamp motion by the guiding blocks 301, 311 of the upper and lower holders 30, 31 to slide along the guiding grooves 401, 411 of the left and right clamping seats 40, 41 synchronously. The working members 50, 51 can provide a linear clamping motion with respect to a work piece 60 by operation of the left and right arms 10, 11. The present invention can be operated smoothly so as to get better work quality.

Figure 5:
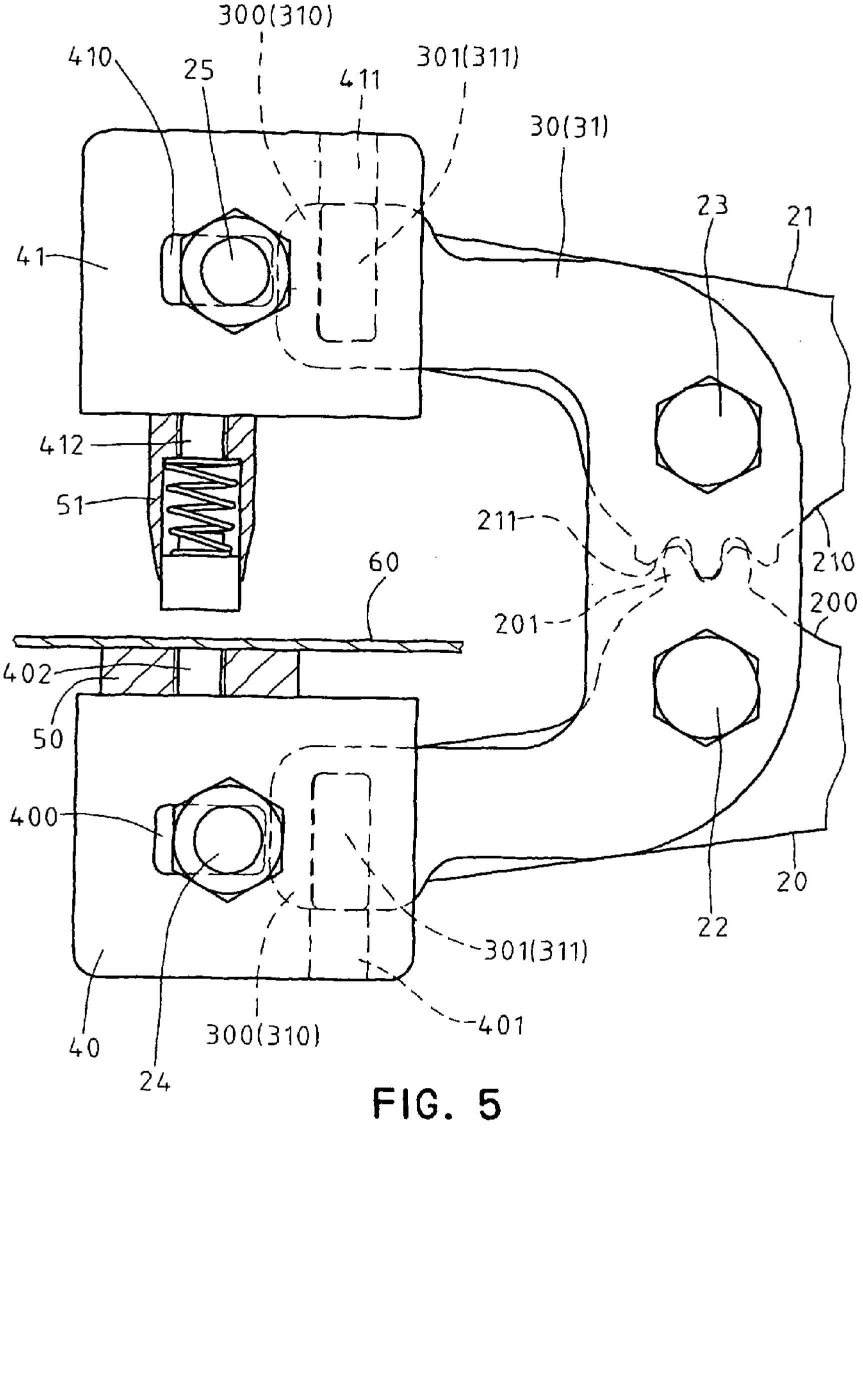
FIG. 5 is a partially enlarged view of FIG. 4.
Figure 7:
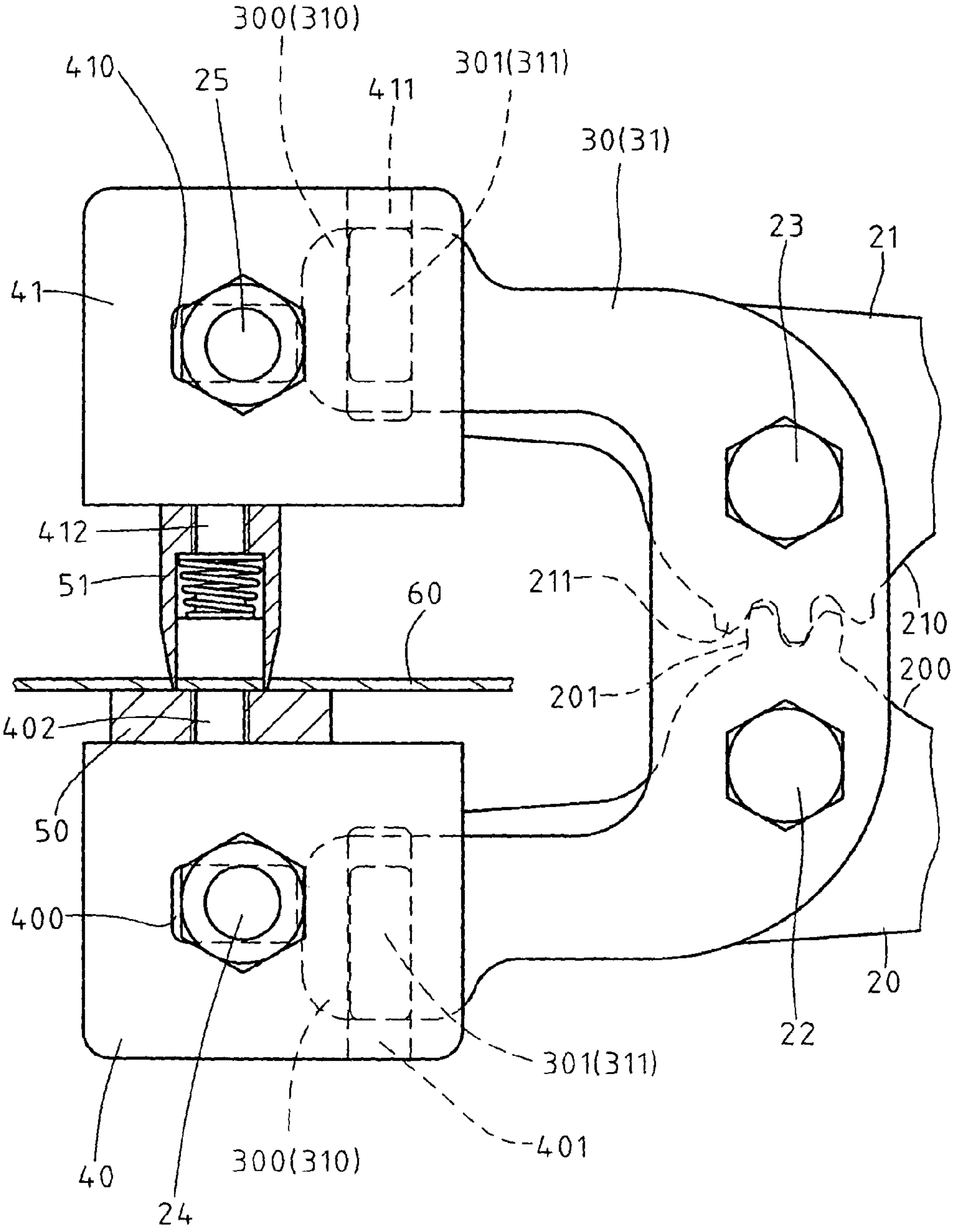
FIG. 7 is a partially enlarged view of FIG. 6.

As shown in FIGS. 4 and 5, the working member 50 coupled on the left fixing portion 402 of the left clamping seat 40 is a blade holder. The working member 60 coupled on the right fixing portion 412 of the right clamping seat 41 is a tubular blade. The work piece 60 is a canvas. The canvas work piece 60 is placed on the blade holder working piece 50, as shown in FIGS. 6 and 7, and the left and right arms 10, 11 are operated to move the left and right clamping seats 40, 41 for a clamping motion, such that the tubular blade working member 50 is linked to steadily perforate the canvas work piece 60 which is placed on the blade holder working member 50 and a tubular perforation 61 is formed on the canvas for mounting a rivet.

Figure 8:
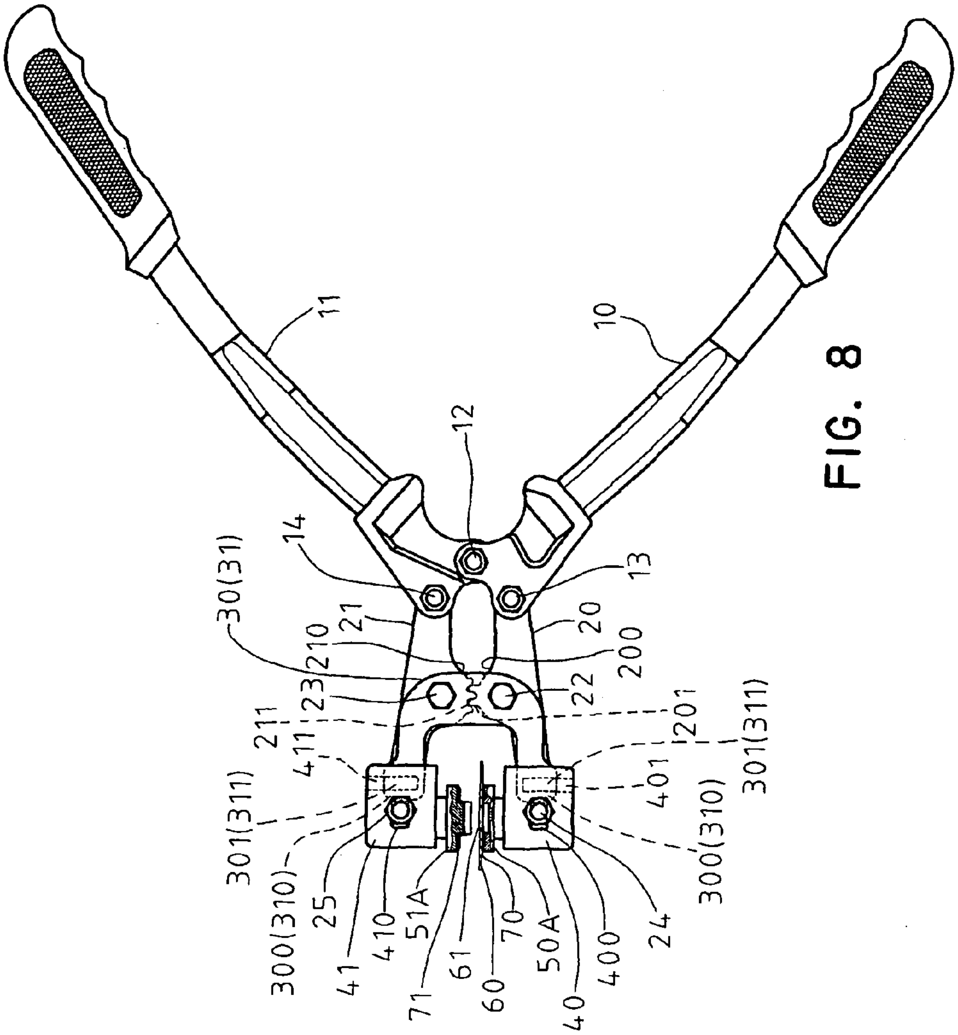
FIG. 8 is a schematic view according to a second preferred embodiment of the present invention before clamping.

As shown in FIG. 8, the working member coupled on the left fixing portion 402 of the left clamping seat 40 is a rivet holder 50A. The working member coupled on the right fixing portion 412 of the right clamping seat 41 is rivet post 51A. The rivet holder 50A is inserted with a female rivet 70 and the rivet post 51A is inserted with a matching male rivet 71. The tubular perforation 61 of the canvas is located between the female and male rivets 70, 71.

Figure 9:
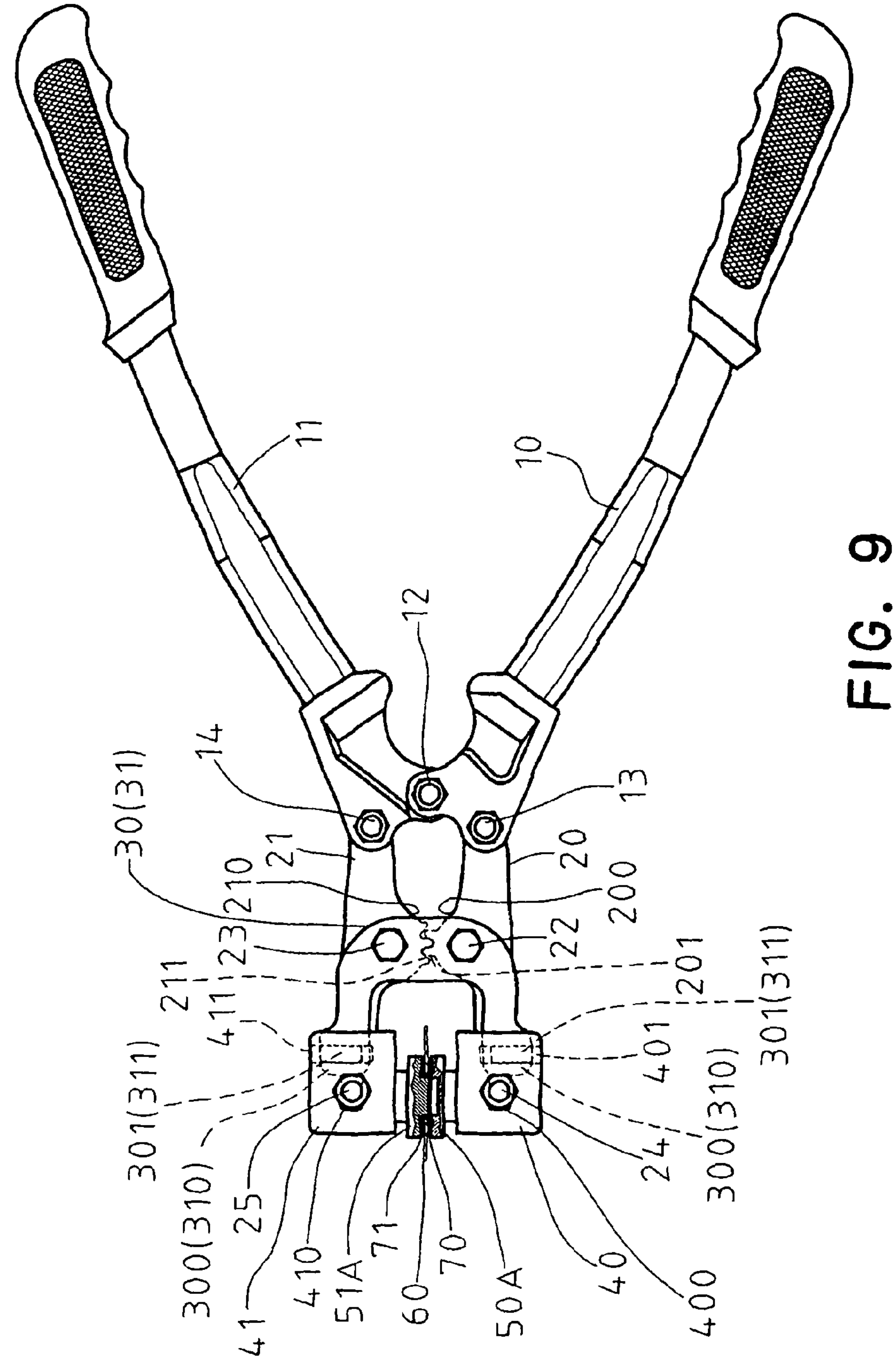
FIG. 9 is a schematic view according to the second preferred embodiment of the present invention after clamping.

As shown in FIG. 9, the left and right arms 10, 11 are operated to move the left and right clamping seats 40, 41 for a clamping motion, such that the rivet holder 50A and the rivet post 51A are linked to compress the female and male rivets 70, 71 to form a rivet buckle which is tightly coupled on the canvas work piece 60.

Referring to FIGS. 1 to 3, the left and right clamping seats 40, 41 are provided with the left and right fixing portions 402, 412 which correspond to each other, and the left and light fixing portions are coupled with the working members 50, 51. The left and right fixing portions 402, 412 of the left and right clamping seats 40, 41 are threaded bolts.

Referring to FIG. 4, the working members 50, 51 are formed with threaded holes, so that the working members 50, 51 can be screwed to the fixing portions 402, 412. As shown in FIGS. 4 and 8, the working members 50, 51 mounted on the left and right clamping seats 40, 41 can be replaced with the working members 50A, 51A in different types.

Although the invention has been explained in relation to its preferred embodiment, it is to be understood that many other possible modifications and variations can be made without departing from the spirit and scope of the invention as hereinafter claimed.

What is claimed is:

1. A flat clamping hand tool structure comprising:

a left arm; and a right arm, wherein an inner edge of one end of the left arm is pivotally connected with an inner edge of one end of the right arm through a first pivot member, an outer edge of the end of the left arm is pivotally connected with a first end of a left swing plate through a second pivot member, and an outer edge of the end of the right arm is pivotally connected with a first end of a right swing plate through a third pivot member;

the left swing plate includes a left limit portion protruding from a middle portion thereof;

the right swing plate includes a right limit portion protruding from a middle portion thereof, the left limit portion being provided with first teeth and the right limit portion being provided with second teeth for meshing with each other, and the left limit portion and the right limit portion being pivotally connected with a U-shaped upper holder and a U-shaped lower holder through a fourth pivot member and a fifth pivot member, respectively;

the upper holder includes a pair of parallel first holder bits;

the lower holder includes a pair of parallel second holder bits;

the first and second holder bits are provided with aligned guiding blocks;

a second end of the left swing plate is pivotally connected with a U-shaped left clamping seat through a first fixing member;

a second end of the right swing plate is pivotally connected with a U-shaped right clamping seat through a second fixing member;

the left clamping seat includes upper and lower surfaces each formed with a left mounting slot for the first fixing member to be inserted therein;

the right clamping seat includes upper and lower surfaces each formed with a right mounting slot for the second fixing member to be inserted therein;

inside the left and right clamping seats are formed with guiding grooves corresponding to the guiding blocks of the upper and lower holders;

the left clamping seat has one side provided with a left fixing portion which faces a right fixing portion provided on one side of the right clamping seat; and the left and right fixing portions are coupled with working members, respectively.

2. The flat clamping hand tool structure of claim 1, wherein the left and right fixing portions of the left and right clamping seats are threaded bolts, and the working members are formed with threaded holes to engage with the threaded bolts.

* * * * *